(12) United States Patent
Faotto

(10) Patent No.: US 10,668,688 B2
(45) Date of Patent: Jun. 2, 2020

(54) INSULATION PANEL FOR CONSTRUCTION AND MANUFACTURING METHOD THEREOF

(71) Applicant: Silcart S.P.A., Carbonera, Treviso (IT)

(72) Inventor: Ugo Faotto, Treviso (IT)

(73) Assignee: SILCART S.P.A. (IT)

( * ) Notice: Subject to any disclaimer, the term of this patent is extended or adjusted under 35 U.S.C. 154(b) by 170 days.

(21) Appl. No.: 14/442,296

(22) PCT Filed: Dec. 27, 2012

(86) PCT No.: PCT/IB2012/057761
§ 371 (c)(1),
(2) Date: May 12, 2015

(87) PCT Pub. No.: WO2013/098781
PCT Pub. Date: Jul. 4, 2013

(65) Prior Publication Data
US 2015/0352806 A1    Dec. 10, 2015

(30) Foreign Application Priority Data
Dec. 28, 2011   (IT) .......................... MI2011A002399

(51) Int. Cl.
| B32B 5/16 | (2006.01) |
| B32B 5/24 | (2006.01) |
| B32B 37/12 | (2006.01) |
| B32B 37/24 | (2006.01) |
| B29C 44/12 | (2006.01) |
| E04B 1/80 | (2006.01) |
| E04C 2/24 | (2006.01) |
| E04B 1/94 | (2006.01) |
| B32B 5/20 | (2006.01) |
| B29K 75/00 | (2006.01) |
| B29K 105/04 | (2006.01) |
| B29K 105/00 | (2006.01) |
| B29L 9/00 | (2006.01) |
| B29L 31/00 | (2006.01) |

(52) U.S. Cl.
CPC ............ *B32B 5/16* (2013.01); *B29C 44/1228* (2013.01); *B32B 5/20* (2013.01); *B32B 5/24* (2013.01); *B32B 5/245* (2013.01); *B32B 37/12* (2013.01); *B32B 37/24* (2013.01); *E04B 1/80* (2013.01); *E04B 1/942* (2013.01); *E04C 2/243* (2013.01); *E04C 2/246* (2013.01); *B29K 2075/00* (2013.01); *B29K 2105/04* (2013.01); *B29K 2105/256* (2013.01); *B29K 2995/0015* (2013.01); *B29K 2995/0016* (2013.01); *B29L 2009/005* (2013.01); *B29L 2031/776* (2013.01); *B32B 2037/243* (2013.01); *B32B 2250/03* (2013.01); *B32B 2255/02* (2013.01); *B32B 2255/20* (2013.01); *B32B 2255/26* (2013.01); *B32B 2255/28* (2013.01); *B32B 2260/021* (2013.01); *B32B 2260/046* (2013.01); *B32B 2266/0278* (2013.01); *B32B 2307/304* (2013.01); *B32B 2307/3065* (2013.01); *B32B 2307/718* (2013.01); *B32B 2313/04* (2013.01); *B32B 2607/00* (2013.01); *Y10T 428/25* (2015.01); *Y10T 428/27* (2015.01)

(58) Field of Classification Search
CPC ........................................................ B32B 5/16
See application file for complete search history.

(56) References Cited

U.S. PATENT DOCUMENTS

| 2,328,249 | A | * | 8/1943 | Ladislaus | ............. | C09D 7/1216 |
| | | | | | | 106/253 |
| 2,938,937 | A | * | 5/1960 | Shenk | ..................... | C04B 26/08 |
| | | | | | | 523/218 |
| 3,865,760 | A | * | 2/1975 | Pitts | ......................... | C08K 3/38 |
| | | | | | | 106/18.12 |
| 4,229,329 | A | * | 10/1980 | Bennett | ..................... | C08K 3/04 |
| | | | | | | 106/287.35 |
| 4,454,190 | A | * | 6/1984 | Katagiri | ................ | C04B 14/022 |
| | | | | | | 162/181.9 |
| 4,748,066 | A | * | 5/1988 | Kelly | ..................... | B31F 1/2809 |
| | | | | | | 156/210 |
| 4,767,656 | A | | 8/1988 | Chee et al. | | |
| 5,057,367 | A | * | 10/1991 | Morii | ........................ | C08K 3/22 |
| | | | | | | 174/110 SR |

(Continued)

FOREIGN PATENT DOCUMENTS

| DE | 102005049788 A1 | 4/2007 |
| EP | 0402333 A2 | 5/1990 |

(Continued)

OTHER PUBLICATIONS

International Search Report for PCT/IB2012/057761 dated Jun. 18, 2014.

(Continued)

*Primary Examiner* — Irina Krylova
(74) *Attorney, Agent, or Firm* — Thomas | Horstemeyer, LLP

(57) ABSTRACT

The invention relates to a multilayer thermal insulation panel for construction (100) and manufacturing method thereof. Such panel comprises: —a main layer (1) in thermally insulating material which comprises a first surface (10) and a second surface (20); —a first backing layer (2) of the main layer connected to the main layer along the first surface (10); a second backing layer (5) of the main layer connected to the main layer along the second surface (20). At least one of such first (2) and second (5) backing layers comprises: —a reinforcement layer (3) in fibrous material, a fire-resistant (4) and thermally insulating layer, —a cladding layer (6) of the reinforcement layer (3); —a binding layer (7) positioned on a surface (8) of the fire-resistant layer (4) in such a way that the fire-resistant layer is sandwiched between the cladding layer (6) and the binding layer. The panel is characterised in that the binding layer (7) is manufactured by means of. a spray-applied aqueous solution of sodium silicates on the surface (8) of the fire-resistant layer (4).

5 Claims, 1 Drawing Sheet

(56) References Cited

U.S. PATENT DOCUMENTS

| | | | | |
|---|---|---|---|---|
| 6,177,232 B1* | 1/2001 | Melisaris | ............... | G03F 7/0037 430/280.1 |
| 6,207,085 B1* | 3/2001 | Ackerman | ............. | C09K 21/12 162/159 |
| 6,855,393 B1 | 2/2005 | Ayres | | |
| 7,438,748 B2* | 10/2008 | Cogen | .................... | B82Y 30/00 106/15.05 |
| 2004/0121152 A1* | 6/2004 | Toas | ......................... | C04B 30/02 428/374 |
| 2005/0032934 A1* | 2/2005 | Muenzenberger | ...... | C08L 33/08 523/179 |
| 2012/0107547 A1* | 5/2012 | Fernando | .................. | B32B 5/24 428/76 |

FOREIGN PATENT DOCUMENTS

| | | |
|---|---|---|
| EP | 1529895 A1 | 5/2005 |
| EP | 2333180 A1 | 6/2011 |
| GB | 569215 A | 5/1945 |
| GB | 2290989 A | 1/1996 |
| GB | 2385856 A | 9/2003 |
| GB | 2409812 A | 7/2005 |
| WO | 1999000559 A1 | 1/1999 |
| WO | 2003102319 A1 | 12/2003 |
| WO | 2006062793 A2 | 6/2006 |

OTHER PUBLICATIONS

Italian Search Report for MI2011A002399 dated Nov. 15, 2012.
English Translation of DE 102005049788 filed on Oct. 18, 2005.
English Translation of GB 569215 filed on May 14, 1945.
English Translation of GB 2290989 filed on Jan. 17, 1996.
English Translation of GB 2385856 filed on Sep. 3, 2003.
English Translation of GB 2409812 filed on Jul. 13, 2005.

* cited by examiner

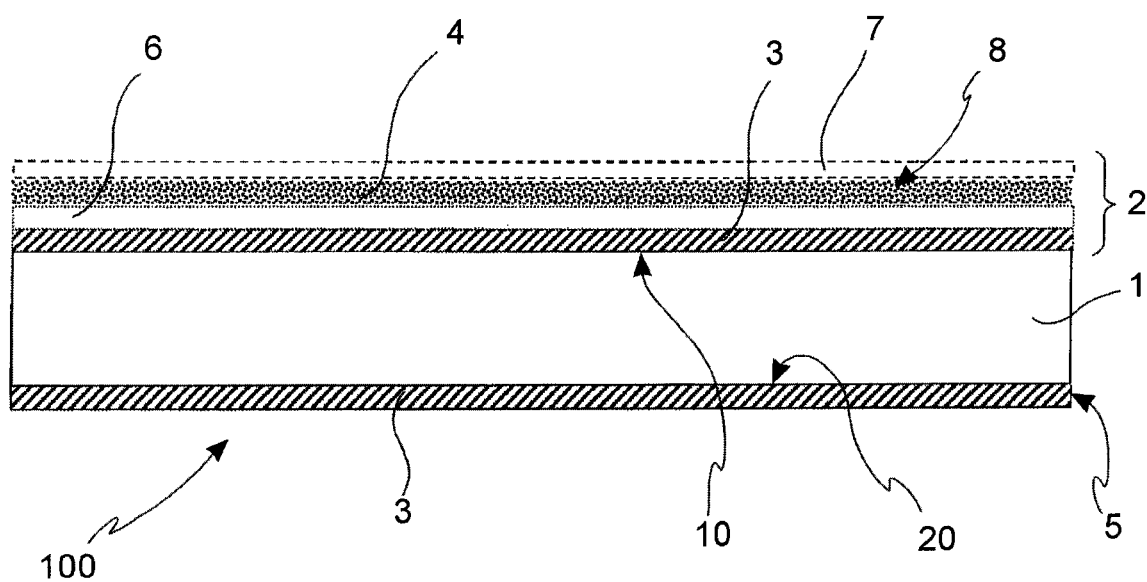

INSULATION PANEL FOR CONSTRUCTION AND MANUFACTURING METHOD THEREOF

CROSS-REFERENCE TO RELATED APPLICATIONS

This application is the 35 U.S.C. § 371 national stage of PCT Application No. PCT/IB2012/057761, filed Dec. 27, 2012, which is herein incorporated by reference in its entirety and which also claims priority to, and the benefit of, Italian Patent Application No. MI2011A002399, filed Dec. 28, 2011, which is herein incorporated by reference in its entirety.

The present invention relates to a multilayer insulation panel for construction, in particular an insulation panel having fire-resistant properties.

Multilayer insulation panels are widely used in building constructions, for example to ensure the thermal insulation of walls, floors and roofs. Such insulation panels for construction of the known type generally comprise an insulation layer, for example manufactured in polyurethane foam, sandwiched between two respective backing layers suitable for cladding such insulation layer. Such backing layers perform a dual role: on the one hand they contain the expansion of the polyurethane foam, and on the other give such panels a predefined shape and thickness, at the same time ensuring dimensional stability.

For example, insulation panels for construction are known wherein the backing layers of the insulation polyurethane layer are made using organic or inorganic materials, such as for example: paper, tarred felt paper, mono-bituminised fibreglass, mineralised fibreglass, aluminium, multilayer film comprising paper, aluminium and films in plastic material in various combinations.

One example of an insulation panel for construction is described in the European patent application n. 04023033 in the name of the Applicant.

It may be observed that the thickness and composition of the aforesaid backing layers make such layers flexible, that is such layers can be bent and rolled up.

As known to a person skilled in the art, insulation panels in polyurethane foam with flexible backing layers of the organic and inorganic type may be classified in five Euro classes depending on a fire resistance property shown by each panel when subjected to tests of various types.

Such fire resistance Euro classes are generally indicated by the letters F, E, D, C, B wherein:
class E indicates a low level of fire resistance;
class B indicates a high level of fire resistance;
class F indicates an indeterminate level of fire resistance.

For example, insulation panels in polyurethane with backing layers of the metallic type (such as aluminium) of a thickness of more than 80 μm fall into the B class of fire-resistance.

A known test used to evaluate the Euro class of a polyurethane panel is the UNI EN 11925 method (Kleinbrenner). The duration of such test varies depending on the classification of the material: 15 seconds for class E, 30 for the higher classes. To pass the test, the height of a flame generated on the test specimen must be contained below a threshold value of 150 mm.

A further known test, the SBI test, sets out to estimate the contribution to the fire of a test specimen subjected to a thermic attack of 40 kW produced by a propane burner for the duration of about 20 minutes. In particular such test measures the energy, expressed in kW, generated by the combustion of the test specimen during the test. A measure of such energy is obtained indirectly by the consumption of oxygen registered during the combustion. The energy curve developed as a function of time is defined the RHR (Rate of Heat Release).

Starting from the aforementioned tests, it is possible to calculate a FIGRA (Fire Growth Rate) parameter with specific algorithms starting from the energy curve RHR. In particular, the value of such parameter, measured in Watt/s, makes it possible to discriminate which of the aforementioned Euro classes the insulation panel in polyurethane belongs to.

For example, panels for which FIGRA values of over 750 watt/s are calculated belong to class E. For FIGRA values between 750 watt/s and 250 Watt/s the panels belong to class D. For FIGRA values between 250 watt/s and 120 Watt/s the panels belong to class C. For FIGRA values below 120 watt/s the panels belong to class B.

It is to be observed that for such insulation panels for construction in polyurethane foam, the performance in terms of fire resistance depends:
on the type of backing layers used (of the organic or inorganic type);
on the type of polyurethane foam.

For example, the panels which have lower performance (class F) are those which use paper (tarred paper, felt paper, etc.) backing layers. Such panels are suitable for applications where there is no risk of direct contact with the flames in the initial stages of the fire (insulation of floors under screeds or perimetral interspaces).

Generally, for a polyurethane insulation panel to be classified fire-resistance B or C according to the standard EN 13501-11925/2 backing layers of the insulation layer of the metallic type need to be used (such as aluminium sheets having a thickness of more than 80 μm).

The purpose of the present invention is to excogitate and make available a multilayer insulation panel for construction which offers an alternative to the insulation panels using metallic backing layers while substantially maintaining the same properties in terms of fire-resistance.

Such purpose is achieved by a multilayer insulation panel for construction according to claim 1.

Preferred embodiments of such multilayer panel are described in the dependent claims 2-20.

The present invention also relates to a method of manufacturing the multilayer panel for construction according to claim 21.

The present invention also relates to a method of manufacturing a backing layer of the multilayer panel for construction according to claim 24 and a relative backing layer according to claim 28.

Further characteristics and advantages of the insulation panel according to the invention will be evident from the description given below of its preferred embodiments, made by way of a non-limiting example with reference to the appended FIG. 1 which shows a transversal cross-section view of an example of the multilayer insulation panel for construction according to the invention.

With reference to the aforesaid FIG. 1, a multilayer panel for construction having thermal insulation properties according to the invention is globally denoted by reference numeral 100. Such insulation panel for construction 100 will also be indicated below as insulation panel or simply panel.

The insulation panel 100 of the present invention may advantageously be used in the building sector to clad walls, floors and roofs.

Such insulation panel 100 comprises a main layer 1 in insulation material, for example in polyurethane foam. Such main layer 1 comprises a first surface 10 and a second surface 20 opposite each other.

The insulation panel 100 further comprises a first backing layer 2 of the main layer 1 in polyurethane connected to the main layer 1 along the aforesaid first surface 10. In addition, the panel 100 comprises a second backing layer 5 of the main layer connected to the main layer 1 along the second surface 20. In other words, the main layer 1 is sandwiched between the first 2 and second 5 backing layers.

At least one of the aforesaid first 2 and second 5 backing layers comprises a reinforcement layer 3 in fibrous material. Such reinforcement layer 3 is manufactured, for example, in fibre glass or hybrid fibreglass (e.g. containing from 40% to 60% of polyethylene terephthalate or PET) or by means of mixed natural, mineral and/or synthetic fibres. In addition, such reinforcement layer 3 may undergo flame retardant treatments.

It is to be observed that the reinforcement layer 3 is suitable for conferring mechanical resistance and dimensional stability on the panel 100.

Advantageously, the at least one of such first 2 and second 5 backing layers of the panel 100 which comprises the reinforcement layer 3 in fibrous material, further comprises a fire-resistant and thermal insulation layer 4. In the example in FIG. 1, the first backing layer 2 comprises both the layer in fibrous material 3 and such fire-resistant layer 4.

In a preferred embodiment, such fire-resistant layer 4 is manufactured in an expansive material. In an even more preferred embodiment, such fire-resistant layer 4 is manufactured in expansive graphite.

It is to be observed that such expansive graphite layer 4 contains, for example, from 50 g/m2 to 500 g/m2 of graphite. Preferably, such layer 4 contains 100 g/m$^2$ of graphite.

In addition, such layer in expansive graphite 4 includes graphite in flakes having a mean diameter in the range of 50 μm-2 mm.

Such expansive graphite, if subjected to temperatures to the order of about 200° C. begins to expand reaching a maximum expansion if placed in contact with the flames, that is, at temperatures of about 600-1000° C. It is to be observed that, in the presence of flames, the graphite may increase its volume by about 50 to about 400 times. In particular the layer of expansive graphite 4 included in the first backing layer 2 of the panel 100, in the presence of flames, is suitable for expanding to create a barrier layer which keeps the flames away from the main layer 1 in polyurethane or, at least, slows down the advance thereof towards such inner insulation layer of the panel 100.

With reference to FIG. 1, in one embodiment of the panel for construction 100 according to the invention, the first backing layer 2 comprises, in addition, a cladding layer 6 of the reinforcement layer 3 configured to be sandwiched between the fire-resistant layer 4 and said reinforcement layer.

In particular, such cladding layer 6 is manufactured with a mixture comprising a resin, additives, fillers and a pigment.

It is to be observed that such mixture is suitable for being spread in fluid form on a surface of the reinforcement layer 3 in fibreglass so as to cover it substantially evenly.

Advantageously, such mixture is suitable for containing the polyurethane foam in the expansion phase in that it closes partially or completely the pores present in the structure of the reinforcement layer 3 in fibreglass.

Moreover, advantageously, the mixture may comprise a flame retardant and refractory agent, such as kaolin, which offers a high resistance to the high temperatures.

In addition, the mixture may comprises an expanding agent, such as modified ammonium phosphate which, in the presence of fire, reacts chemically releasing a carbon foam having insulating properties to thus retard the raising of the temperature and the contact of the flame with the main layer 1 in polyurethane.

In one embodiment, the resin of the mixture is an SBR (Styrene Butadiene Rubber), acrylic styrol or acrylic polymer type resin.

Moreover, the aforementioned additives of the mixture comprise, for example, a de-aerating agent, a thickener, an anti-sedimenting agent, wetting agent, an anti-mould agent, anti-bacteria agent, anti-insect agent.

In addition, the fillers of the mixture comprise inert mineral fillers, such as calcium carbonate. The aforesaid mineral fillers may also comprise fire-resistant fillers such as for example, colemanite/magnesium hydroxide or another equivalent additive.

It is to be observed that the cladding layer 6 comprised in the first backing layer 2 contains from 50 g/m2 to 500 g/m2 of the mixture.

Moreover, the resin of the mixture has a percentage in weight comprised between 5% and 20%. The pigment of the mixture has a percentage in weight of 5% or less. The additives of the mixture have a percentage in weight comprised between 10% and 30%. The inert mineral fillers of the mixture have a percentage in weight comprised between 30% and 60%. The fire-resistant mineral fillers of the mixture have a percentage in weight comprised between 1% and 15%.

The aforementioned expanding agent has a percentage in weight comprised between 1% and 10%. The refractory agent of the mixture has a percentage in weight comprised between 3% and 10%.

With reference to FIG. 1, the first backing layer 2 of the panel 100 comprises, moreover, a binding layer 7 positioned on a respective surface 8 of the fire-resistant layer 4 in such a way that the fire-resistant layer 4 is sandwiched between the cladding layer 6 and the aforesaid binding layer 7.

In particular, the binding layer 7 is manufactured by means of a spray-applied aqueous solution of sodium silicates on the respective surface 8 of the fire-resistant layer 4, that is to say, on the expansive graphite. Such sodium silicate solution is suitable for binding and fixing the flakes of expansive graphite avoiding its dispersion.

The main characteristics of sodium silicate solutions or equivalent binding agents which may be used in making the panel for construction 100 of the invention are:
  properties of adhesion and rendering inert, thanks to the ability to give rise to siloxane polymer chains (composed, that is to say, of alternate atoms of silicon and oxygen) with the single unit of sodium silicate;
  binding action by means of physical and chemical adhesion;
  film-forming action, due to the evaporation of the water, to the siloxane polymerisation and the increase in viscosity;
  fire-resistant action, due to the formation of refractory and thermal insulation films which prevent the close contact of combustible (wood, paper, cotton etc.) and the combustion agent (air) essential for combustion;
  heat resistance, due to the organic nature and above all the non-volatility of the polymerised silicates.

It is to be observed that, the second backing layer 5 of the panel 100 may comprise the same stratigraphy as the first backing layer 2, that is to say the panel 100 has fire-resistant properties on both sides. Alternatively, the second backing layer 5 may be made, for example, in paper, tarred felt paper, mono-bituminised fibreglass, mineralised fibreglass, aluminium, multilayer film comprising paper, aluminium and films in plastic material in various combinations or in other metallic materials.

In a second embodiment, the first backing layer 2 of the panel 100 comprises the reinforcement layer 3 in fibrous material and the cladding layer 6 of such reinforcement layer analogous to those described above. The fire-resistant layer 4, placed over the cladding layer 6, is made from a further mixture comprising an expansive material, such as expansive graphite having the characteristics described above, a resin and additives.

In one embodiment, the further mixture of the fire-resistant layer 4 comprises:
- a resin in a percentage comprised between about 40% and 55%;
- expansive graphite in a percentage comprised between about 35% and 50%;
- additives in a percentage of about 10%.

In particular such additives comprise:
- water in a percentage comprised between about 4% and 9.4%;
- an anti-foaming agent in a percentage comprised between about 0.2% and 2%;
- a dispersing plasticising retardant agent in a percentage comprised between about 0.2% and 2%.

In particular, the aforesaid resin is a polymeric dispersion of polymers or copolymers such as, for example, acrylics, vinyls, silicone, silanes, polyurethanes, to which further flame retardant additives are added if necessary.

Moreover, the resin is configured to englobe the expansive graphite, in particular creating a film which binds such graphite to the support 2. In other words, the resin is suitable for plasticising the fire resistant layer 4, at the same time providing a contribution to the fire resistance of said backing layer 2 by means of the further flame retardant additive contained therein.

An example of the method of manufacturing a multilayer panel for construction 100 according to the present invention will be described below.

In an initial step of the method, manufacturing of the first backing layer 2 is envisaged.

Starting from a reinforcement layer in fibrous material 3, such method comprises a step of making the cladding layer 6 on the reinforcement layer 3. In greater detail, such step envisages a step of spreading the mineral mixture in fluid form on the reinforcement layer 3 in fibreglass.

In a second step, the manufacturing method of the panel 100 envisages a step of forming a fire-resistant layer 4 which comprises a step of depositing the expansive graphite in flakes on the still wet cladding layer 6, for example by means of a "talcing" device of the known type. In particular, during such step at least partial adhesion between the aforesaid fire-resistant 4 and cladding 6 layers takes place and the graphite is distributed in a substantially even manner.

It is to be observed that the graphite deposited in excess on the cladding layer 6 is removed by making the reinforcement layer 3 being processed run over suitable rollers which make said layer follow a route with sharp bends to overturn at least twice in succession such reinforcement layer 3. This way, the graphite deposited in excess is more likely to fall off by gravity, such step being followed by an aspiration step of such excess graphite.

A third step of manufacturing envisages a step of spraying the sodium silicate solution on the graphite layer 4 to make the binding layer 7.

In particular such sodium silicate solution performs a fixing and binding action of the flakes of graphite of the fire-resistant layer 4, which thus remain adherent to the cladding layer 6 of mineral mixture.

As highlighted above, the aforementioned superposed reinforcement 3, cladding 6, fire-resistant 4 and binding 7 layers form the first fire-resistant backing layer 2 of the panel 100 in FIG. 1.

In a subsequent fourth step of the manufacturing method of the panel 100, a drying step of the first backing layer 2 obtained is envisaged, for example in a hot air furnace, for example at a temperature of about 150° C. to 200° C.

Such drying step makes it possible to dry the mineral mixture and fix the sodium silicate.

It is to be observed that the production line of the backing layer 2 works continuously with a roll to roll system wherein the reinforcement layer in fibre glass is unwound, the various materials deposited and the backing layer 2 obtained rewound once dry.

The manufacturing method of the panel 100 comprises a step of applying said first backing layer to at least one of the first 10 or second 20 surfaces of the main layer 1 in thermally insulating material of the panel 100.

In a first embodiment, in the case of panels in polyurethane foam, such application step comprises a further step of spraying a polyurethane foam between the first backing layer 2 as made above and the second backing layer 5 which is the same as the first layer 2 or different therefrom. In this second case, the second backing layer 5 may be, for example in tarred felt paper, bituminised glass veil, mineralised glass veil, multilayer film, metal. Such first 2 and second 5 backing layers are suitable for containing the expansion of the polyurethane foam which forms the main insulation layer 1.

In a second embodiment, such application step comprises a step of gluing said first backing layer 2 to at least one of the first 10 or second 20 surfaces of the preformed main insulation layer 1. In such latter case, the pre-formed insulation layer may be in polyurethane or alternatively an insulation layer made with synthetic insulation materials, such as for example polystyrene foam or extruded polystyrene, phenolic foam, mineral or natural, such as for example the wood fibre which improves the performance of reaction to fire of the panel 100.

A further embodiment of the manufacturing method of the first flexible backing layer 2 of the panel 100 wherein the fire-resistant layer 4 is made by means of a further mixture comprising the expansive graphite and plasticising resin is described below.

In particular, starting from a reinforcement layer in fibrous material 3, such method comprises a step of making the cladding layer 6 on the reinforcement layer 3. In greater detail, such step envisages a step of spreading the mineral mixture in fluid form on the reinforcement layer 3 in fiberglass.

In a second step, the fire-resistant layer 4 is made by spreading on the cladding layer 6 the further fluid mixture comprising the expansive graphite, the resin and the additives (water, anti-foam agent, dispersing agent).

Subsequently to such spreading steps, the method comprises a drying step, for example in a hot air furnace, of the first backing layer 2. It is to be observed that the temperature in such furnace is kept below 190° C. to prevent accidental expansions of the graphite. Such drying step permits both the drying of the mineral compound of the cladding layer 6 and the drying and plasticising of the resin of the fire-resistant layer 4.

In this second embodiment, the production line of the first backing layer 2 works continuously with a roll to roll system wherein the reinforcement layer 3 in fiberglass is unwound, the mixtures are spread and the backing layer 2 rewound once dry. Compared to the manufacturing method described in relation to the first embodiment, it is not necessary to overturn the first backing layer 2 to eliminate the excess graphite.

The multilayer insulation panel 100 for construction described above presents numerous advantages.

Mainly, such panel 100 gives high performance in terms of fire resistance.

In particular, the first backing layer 2 is suitable for conferring fire-resistant properties to the panel 100, in particular if such backing layer 2 is applied to both the opposite surfaces 10 and 20 of the main insulation panel 1. In fact, the first backing layer 2 protects the main layer 1 in polyurethane foam, preventing or slowing down the direct contact of such foam with the flames.

Such fire-resistant properties are due to the use of expansive graphite in the fire-resistant layer 4. Such graphite, expanding as the temperature increases, acts as a first barrier to the flames.

In addition, the mixture which forms the cladding layer 6 may also have flame retardant and refractory agents added to it which offer a high resistance to the high temperatures and pose resistance to the fire. In other words, the cladding layer 6 represents a second barrier to the advance of the flames towards the main layer 1 of the panel 100.

Moreover, the mixture of the cladding layer 6 may also comprise phenolic resins to further increase the fire resistance of the panel 100.

It is to be observed that subjecting the panel 100 to a reaction to fire test SBI, the Applicant has calculated experimentally a FIGRA value of about 119. Consequently, such panel 100 may be classified in class B according to the standard EN 13501-11925/2.

Moreover, the use of sodium silicates in the binding layer 7 further increases the fire resistant properties and heat resistance of the panel 100.

Moreover, advantageously, when two or more construction panels 100 according to the invention are placed adjacent to each other, the use of expansive graphite in the fire resistant layer 4 also permits, in the case of fire, the protection of the junctions between such adjacent panels. In fact, the expansion of the graphite as the temperature increases makes it possible to seal such junctions.

A person skilled in the art may make modifications and adaptations to the embodiments of the multilayer insulation panel for construction and relative manufacturing method thereof described above, replacing elements with others functionally equivalent, so as to satisfy contingent requirements while remaining within the sphere of protection of the following claims. Each of the features described as belonging to a possible embodiment may be realised independently of the other embodiments described.

The invention claimed is:

1. A backing layer of a multilayer thermal insulation panel for construction, comprising:
   a reinforcement layer in fiberglass;
   a cladding layer of the reinforcement layer comprising a first mixture spread in fluid form on said reinforcement layer, wherein the cladding layer contains from 50 g/m$^2$ to 500 g/m$^2$ of the first mixture, wherein said first mixture comprises a resin, additives, mineral fillers and a pigment, and wherein the mineral fillers comprise an inert mineral filler and fire-resistant fillers; and wherein:
      the resin of the first mixture is an acrylic styrol resin and has a percentage in weight of between 5% and 20% of the first mixture,
      the pigment of the first mixture has a percentage in weight of less than 5% of the first mixture,
      the additives of the first mixture comprise an anti-sedimenting agent and a thickener and the additives have a percentage in weight of between 10% and 30% of the first mixture,
      the inert mineral filler of the first mixture is calcium carbonate and has a percentage in weight of between 30% and 60% of the first mixture, and
      the fire-resistant fillers of the first mixture have a percentage in weight of between 1% and 15% of the first mixture, wherein the fire resistant fillers comprise colemanite;
and
   a fire-resistant layer placed on the cladding layer and made from a second mixture comprising:
   an expansive graphite, a resin, and additives; wherein the fire-resistant layer contains from 50 g/m$^2$ to 500 g/m$^2$ of the expansive graphite and includes expansive graphite in flakes having a mean diameter in a range of about 50 μm-2 mm, wherein:
      the resin of the second mixture is a vinyl copolymer and has a percentage in weight of between 40% and 55% of the second mixture,
      the expansive graphite of the second mixture has a percentage in weight of between 35% and 50% of the second mixture, and
      the additives of the second mixture have a percentage in weight of about 10% of the second mixture, and wherein the additives comprise water in a percentage in weight of between about 4% and 9.4% of said additives of the second mixture; and
wherein the backing layer further comprises a binding layer positioned on a surface of the fire-resistant layer in such a way that the fire-resistant layer is sandwiched between the cladding layer and the binding layer.

2. The backing layer of the multilayer thermal insulation panel for construction according to claim 1, wherein said fire-resistant layer is manufactured by spreading the second mixture on said cladding layer, wherein said additives of said second mixture further comprise:
   an anti-foaming agent in a percentage in weight of between about 0.2% and 2% of said additives of the second mixture; and
   a dispersing agent in a percentage in weight of between about 0.2% and 2% of said additives of the second mixture.

3. The backing layer of the multilayer thermal insulation panel for construction according to claim 1, wherein said resin of the second mixture is a plasticising resin configured to englobe the expansive graphite and forms a film which binds the expansive graphite to the cladding layer.

4. The backing layer of the multilayer thermal insulation panel for construction according to claim 1, wherein the cladding layer further comprises an expanding agent and a refractory agent.

5. The backing layer of the multilayer thermal insulation panel for construction according to claim 1, wherein the binding layer is sodium silicate.

* * * * *